Aug. 27, 1946.                W. W. HANSEN ET AL                 2,406,371
                     OBJECT DETECTING APPARATUS AND METHOD
                     Original Filed July 8, 1938      3 Sheets-Sheet 3

INVENTORS:
W. W. HANSEN, R. H. VARIAN
BY   S. F. VARIAN
         Paul B. Hunter
         ATTORNEY Patented Aug. 27, 1946

2,406,371

UNITED STATES PATENT OFFICE 2,406,371

OBJECT DETECTING APPARATUS AND METHOD

William W. Hansen, Russell H. Varian, and Sigurd F. Varian, Garden City, N. Y., assignors to the board of trustees of The Leland Stanford Junior University, Stanford University, Calif.

Original application July 8, 1938, Serial No. 218,064. Divided and this application December 29, 1943, Serial No. 516,012

38 Claims. (Cl. 250—1)

This invention relates, generally, to the generation, modulation, detection, amplification, transmission and reception of electromagnetic energy, and the invention has reference, more particularly to a novel electron discharge tube apparatus and method adapted for such uses and for remote object detection, and operating at frequencies of the order of $10^8$ or more cycles per second. The present application is a true division of application Serial No. 218,064, filed July 8, 1938.

This invention is related to the following co-pending patent applications: Serial No. 92,787, W. W. Hansen, High efficiency resonant circuit, filed July 27, 1936 (now Patent No. 2,190,712, issued February 20, 1940); Serial No. 168,355, R. H. Varian, Electrical converter, filed October 11, 1937 (now Patent No. 2,242,275, issued May 20, 1941); Serial No. 185,382, R. H. Varian and W. W. Hansen, Radio measurement of distances and velocities, filed January 17, 1938; Serial No. 193,268, W. W. Hansen, R. H. Varian and L. M. Applegate, Electrical converter, filed March 1, 1938 (now Patent No. 2,272,165, issued February 3, 1942); and Serial No. 201,898, R. H. Varian and W. W. Hansen, Radio transmission and reception, filed April 14, 1938 (now Patent No. 2,280,824, issued April 28, 1942).

The principal object of the present invention is to provide a novel electronic apparatus adapted for generating, transmitting, receiving, or detecting high frequency signals.

Another object of the present invention lies in the production of improved-super-regenerative receivers for high frequencies.

A further object of the invention is to produce instruments capable of operating efficiently as oscillators while acting at the same time as sensitive detectors and to accomplish non-linear feedback in regenerative apparatus.

A still further object of the invention is to produce methods and means for detecting objects at a distance by the transmission and reception of radio waves intercepted by such objects.

Still another object of the invention is to provide improved detectors for velocity modulated electron beams.

Yet another object of the present invention is to provide improved electron discharge apparatus having substantially constant mutual conductance.

A still further object of the present invention is to provide improved electron discharge apparatus with electron beam and/or non-linear feedback means.

Other objects and advantages will become apparent from the specification, taken in connection with the accompanying drawings wherein the invention is embodied in concrete form.

In the drawings.

Similar characters of reference are used in all of the above figures to indicate corresponding parts.

Figure 1:
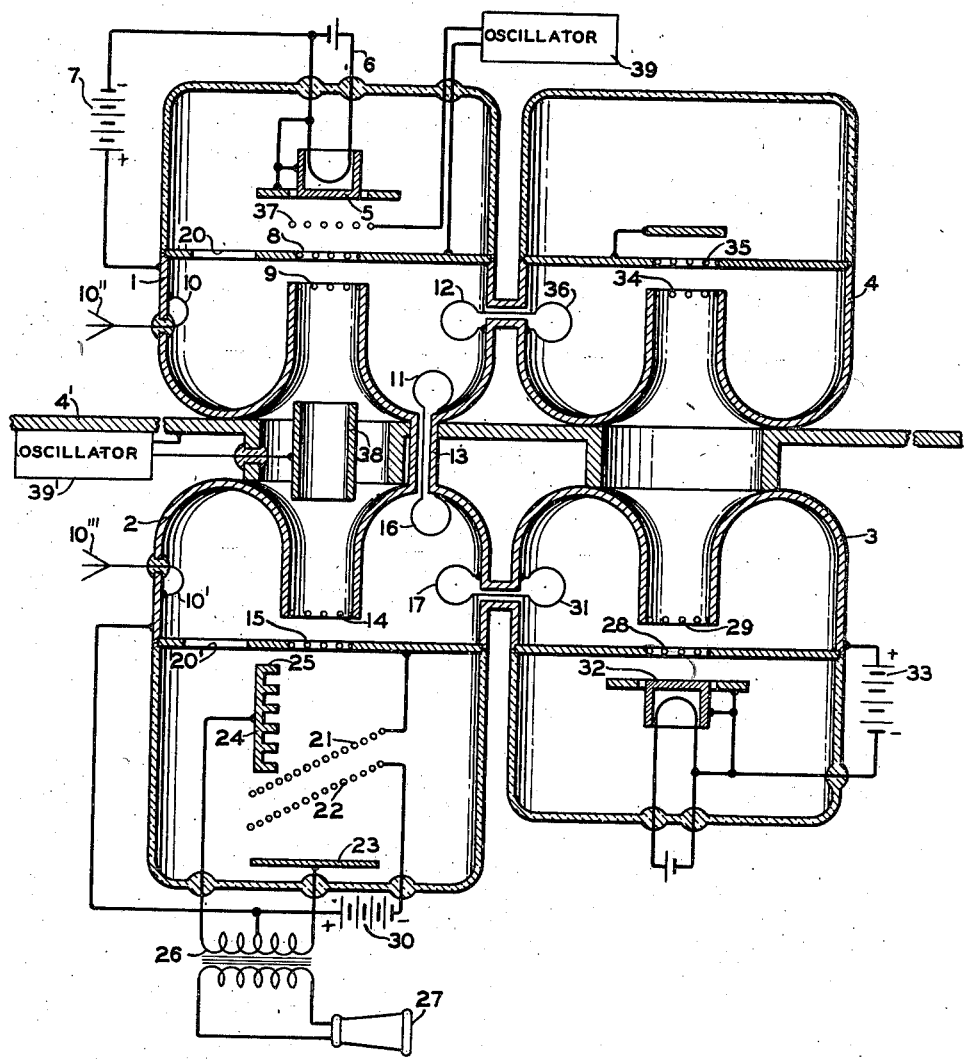
Fig. 1 is a diagrammatic representation of one form of the present invention.

Referring now to Fig. 1, the present invention will be explained in a form convenient both for construction and explanation. In Fig. 1 there are four resonant circuit members or cavity resonators 1, 2, 3 and 4 of the type shown in co-pending application Serial No. 214,452, filed June 18, 1938, in the name of W. W. Hansen and S. F. Varian, now Patent No. 2,242,249, issued May 20, 1941. Circuit members 1 and 2 together with circuit members 3 and 4 and their associated apparatus comprise two intercoupled velocity grouped electronic circuit means the principles of operation of which are described in Patent No. 2,242,275. In the first unit comprising circuit members 1 and 2 there is an electron emitter 5 such as an activated oxide surface heated by a filament 6. The emitter 5 is connected with a battery 7 for accelerating the electrons from emitter 5 into the system. Circuit member 1 is provided with a pair of spaced grids 8 and 9 and two coupling loops 11 and 12. Loop 11 is connected to a line 13 for coupling to circuit member 2, and loop 12 is used for coupling into circuit member 4. Members 1 and 2 are also shown provided with coupling loops 10 and 10' and connected antennae 10'' and 10'''. Openings 20 and 20' may be used with or in lieu of antennae 10'' and 10''' for receiving and radiating energy. Member 2 has a pair of spaced grids 14 and 15, and two coupling loops 16 and 17. Loop 16 is connected to line 13 for coupling into resonant circuit member 1, and loop 17 is used to couple member 2 to member 3.

On the exterior of member 2 there is shown a novel detector arrangement which resembles in part the detector arrangement shown in application Serial No. 185,382, but which has certain advantages over that arrangement. In the present arrangement, two spaced grids 21 and 22 are placed near the grid 15 but at an angle with respect to the latter. A plate 23 is placed near the grid 22 on the side opposite grid 15. A second plate 24 is placed as indicated about at right angles to the surface of grid 15. The surface of plate 24 is provided with fins 25 or other means for preventing secondary electron emission from plate 24. Plates 23 and 24 are connected to a push-pull transformer 26 which delivers its output to a telephone or other receiver 27. Between the emitter 5 and the grid 8 there is located a control grid 37 connected to an oscillator 39 of comparatively low frequency. Between resonators 1 and 2 there is a tube 38 connected to a second low frequency oscillator 39'.

Circuit members 3 and 4 are arranged similarly to circuit members 1 and 2, respectively. Member 3 has a pair of spaced grids 28 and 29 and a coupling loop 31. An electron emitter 32 and a battery 33 correspond to similar elements of circuit member 1. Circuit member 4 has spaced grids 34 and 35 and a coupling loop 36.

The system shown in Fig. 1 may be operated in either of two ways. The simpler way is to omit resonators 3 and 4 and to operate the rest of the apparatus as a complete system within itself. A second way is more complicated, and also includes the use of resonators 3 and 4 and their effects. The operation taking place when omiting members 3 and 4 being the simpler, will now be described. In this operation of the system, the electrons of the beam in passing through the grids of resonant circuit member 1 are alternately accelerated and decelerated as explained in Patent No. 2,242,275. As a result of the changes in velocities of the electrons of the beam they arrive at the grid 14 of member 2 in groups or bunches distributed in time at the frequency of the oscillation of the system. Energy is taken from the electrons by the field of member 2 and this member is thereby excited to a state of oscillation. Energy of oscillation is transmitted from circuit member 2 to member 1 through coupling loop 16, transmission line 13, and coupling loop 11. Thus, the field of member 1 is maintained in a state of oscillation and the electron beam is accordingly acted upon and "bunched."

Radiation from the fields of both circuit members 1 and 2 or from either one is possible. Likewise, energy can be received by either one. The resonator or circuit member 2 has stronger oscillations in it than has the resonator 1, and consequently radiation from member 2 is of greater intensity than that from member 1. Conversely, reception is more favorable in member 1 than in member 2 because a signal entering 1 is amplified by the bunching effect and appears with greater intensity at member 2 than a signal introduced directly into 2. Inasmuch as reception is better performed in member 1, and transmission better performed in member 2, radiating elements such as either loops 10 and 10' or holes 20 and 20' or both may be used in the members 1 and 2.

Assuming that a modulated carrier frequency is received by member 1 through either hole 20 or antenna 10" then, the electrons of the beam travel through grids 14 and 15 of member 2 and encounter grids 21 and 22. The electrons emerging from grid 15 have varying velocities depending upon the strength of oscillation in the circuit members 1 and 2. Some of the electrons pass through grids 21 and 22 and hit plate 23. Other electrons, i. e. the slower ones, are reflected from grids 21 and 22 to plate 24. The two grids 21 and 22 are parallel and close together. A potential difference, with grid 22 negative, is established between grids 21 and 22 by the battery 30. The resultant field between grids 21 and 22 acts like a flat mirror insofar as the slower electrons leaving grid 15 are concerned. These electrons enter the field between grids 21 and 22 and their motion is opposed by this field and they are deflected toward plate 24. The faster electrons are deflected, or rather, refracted, but they penetrate the field between grids 21 and 22 and hit plate 23. The slower electrons are not able to penetrate the field between grids 21 and 22 and they bounce to the left as in ordinary optical reflection from grid 21 to hit plate 24. In the structure constituted by members 1 and 2, all the electrons leaving the grid 15 have substantially the same velocity when the system is not oscillating. As the amplitude of oscillation increases, the electrons vary in velocity, the extremes of velocity being the greater, the greater the amplitude of oscillation. The potential difference between grids 21 and 22 is adjusted either so that most of the electrons are reflected toward plate 24, or so that most of them are permitted to pass through to plate 23. The precise difference of potential between grids 21 and 22 giving the most sensitive or the most efficient detector action as may be preferred can be found by experimental adjustment of battery 30. The detector characteristic of this system is analagous to that found in ordinary vacuum tube circuits. Since practically all the electrons emerging from grid 15 eventually strike either plate 23 or plate 24 any increase in current reaching one of the plates is accompanied by a decrease in current reaching the other plate. Hence, the current produced by electrons reaching plate 23 is 180 electrical degrees out of phase with current produced by electrons reaching plate 24, and accordingly the currents from plates 23 and 24 are appropriate to the operation of any push-pull apparatus, such as transformer 26 and receiver 27, usually used with push-pull detectors. Hence, the received signal is heard at phone 27.

The grid 37 and the tube 38 and the oscillators 39 and 39' are used to control the operation of the system as by producing modulation or for starting and stopping oscillation. The actions of grids in the location of grid 37 and tubes in the location of tube 38 have been described in application Serial No. 185,382 and Patent No. 2,280,824. The action of these elements can be summarized by mentioning that an alternating voltage applied to grid 37 or to tube 38 accomplishes amplitude modulation with some frequency modulation. Also, in the use of grid 37 and tube 38 if the voltage is made sufficiently high the oscillation of the system can be stopped during part of every modulating cycle. The frequency of oscillators 39 and 39' may be any desired up to about $10^7$ cycles per second, or even more if the frequency of the circuit members 1 and 2 is higher than $10^8$ or $10^9$ cycles per second. Ordinarily, the frequencies of oscillators 39 and 39' will be well within the frequency range of ordinary triode oscillators. Either grid 37 or tube 38 or both may be used. Ordinarily only one will be required, although in some instances it will be convenient to use both operating at different frequencies.

The assemblage shown in the figure will operate as a simple velocity modulation apparatus for transmission of radio waves or for the detection thereof or both. It will also operate as a modulated oscillator-transmitter or as a superregenerative receiver. In one specialized application of the system it is set up as a transmitter-detector. For best results the assemblage is placed in a suitable parabolic or other reflector as described in application Serial No. 185,382. The system is adjusted for sensitvity in either of two modes of operation. Either the electron accelerating voltage of battery 7 is set so that the phase of arrival of electrons in the circuit member 2 is such as to give maximum oscillation, and the coupling is reduced by adjusting loops 11 and 16 sufficiently so the oscillator will barely oscillate, or the electron accelerating voltage is set so that the phase of arrival of the bunches in the circuit member 2 departs considerably from that which gives maximum oscillation, and the electron current or coupling 11—16 or electron accelerating voltage is adjusted just to sustain oscillation. Experiments indicate that the latter mode of operation is the more sensitive. Under these conditions of oscillation, radiation leaving the system by way of antenna 10''' or hole 20' can return by reflection from a distant object and re-enter member 1. The returned radiation will produce a field in member 1 which may have any possible phase difference relative to the "bunching" field therein. The returned radiation will be amplified by bunching initiated in member 1, "catching" in member 2, and feedback into member 1 in a manner analogous to that in a regenerative detector. The amplified signal will combine with the steady oscillation of the system and it will add to or subtract from the steady oscillation depending on the relative phase of the received signal and the steady oscillation of the system. The observed result of the action of the system will be to receive at receiver 27 a signal of undulating intensity as the distance from circuit member 1 to the outside reflector or object varies. The variation in distance will cause a corresponding variation in phase of the received signal.

In the operation of the system as described above in which the adjustment is critically made, the reception of energy at the frequency of the transmitted energy, that is, the reception of energy transmitted and reflected back to the system, has the same effect as if the rate of energy loss were changed by any other cause. The effect is the same as if the radiation resistance were changed, and insofar as an analysis of operation of the system is concerned, the reflector or object outside which returns radiation to the system is in effect part of the system. Accordingly, it is convenient to consider the combined effects of transmission and reception as if the variation in resultant detected signal were the effect of variation of radiation resistance.

In these methods of operation grid 37, tube 38 and oscillators 39 and 39' are not used.

Another way of operating the system is to use either grid 37 or tube 38 with one of their oscillators 39 or 39' adjusted so that during part of the low frequency oscillation cycle the system will oscillate strongly and during another part of the cycle the same will oscillate weakly. It is characteristic of velocity modulation apparatus of the present type, one form of which is known by the registered trade-mark "klystron" of the Sperry Gyroscope Company, Inc., that it is comparatively sensitive to the effects of incoming signals when oscillating weakly but relatively insensitive when oscillating strongly. For effective radiation strong oscillations are desired. The adjustment of voltage on grid 37 or tube 38, whichever is used, is such as may be required to nearly stop oscillations during part of each low frequency cycle. During other parts of the cycle the system can operate with less restriction and at some parts of the cycle without any restriction.

Thus, the system transmits pulses of high frequency radiation, the pulses being at the frequency of the low frequency oscillators 39 or 39', and in between pulses of radiation the system is prepared to receive radiation. If the transmitted radiation encounters a suitable reflecting body or object some radiation will be returned to the system where it will be received and detected during the reception part of the low frequency cycle. In this mode of operation, the system operates alternately as a detector and as an oscillator. Furthermore, it may operate as a superregenerative detector if adjusted properly. The conditions for superregeneration are, in general, fulfilled if the oscillator is allowed repeatedly to build up self-sustained oscillations for a period shorter than the time required for the oscillator to reach full oscillation, and then is stopped. The amplitude reached before oscillation is stopped is then sensitive to incoming signals.

Thus, it will be evident by reference to application Serial No. 185,382 that the system described herein is applicable to the uses described in that application. In general, the present invention can be used in many applications such as location of remote objects requiring an oscillator transmitter and receiver detector operating either simultaneously or alternately. When using this apparatus for the purpose of locating remote objects a shield 4' would ordinarily be used between the transmitter antenna 10''' and the receiver antenna 10''.

The operation of the system shown in Fig. 1 including use of circuit members 3 and 4 resembles that described when using members 1 and 2 alone, but the use of 3 and 4 provides a novel type of control for members 1 and 2. This novel type of control accomplishes, in effect, a feed-back from circuit member 2 to circuit member 1 which is non-linear, that is, feed-back in which the transfer of energy is not proportional to the energy in the primary circuit. The use of this type of feed-back enables the device to operate efficiently as an oscillator and as a detector at the same time, as will further appear.

Figure 4:
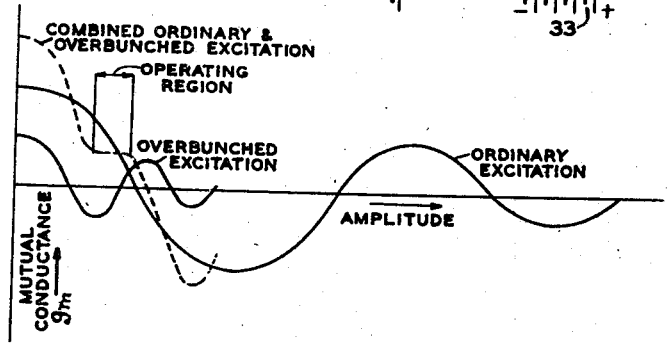
Fig. 4 is a curve representing the performance of the apparatus of the present invention.

For sensitivity in detection as an oscillator-detector the mutual conductance of the circuit should be substantially constant. The mutual conductance is the ratio of the change in output load current of the system to the change in input control voltage of the system. In the ordinary velocity-modulated tube of the "klystron" type, shown in Patent No. 2,242,275, the mutual conductance is constant at small amplitudes of oscillation, and then gradually decreases at large amplitudes of oscillation. This is indicated in Fig. 4 in which the mutual conductance of a circuit is indicated as ordinates and the amplitude of oscillation as abscissae. In this figure there are three curves drawn, one showing mutual conductance as a function of amplitude in such a tube with ordinary or normal excitation, a second curve showing mutual conductance as a function of amplitude in the tube with "over-bunched" excitation, and a third curve showing the operation of the tube with a combination of normal feed-back and feed-back through an over-bunched tube. In the curve showing operation with this combined form of excitation conforming to Fig. 1 when resonators 3 and 4 are used, there is a region in which the mutual conductance is substantially constant over a considerable range of amplitude. This is indicated on the curve by the expression "operating region."

For quantitative examination of the operation of the tube an expression for mutual conductance ($G_m$) is stated as follows:

$$G_m = \frac{I_0}{V_0} \frac{2\pi L}{\beta \lambda} \frac{J_1(x)}{x}$$

where $$x = \frac{\pi L}{\beta \lambda V_0} V_1$$

$I_0$ = current in the electron beam,
$L$ = bunching distance which in Fig. 1 is the distance between grid 9 and grid 14,
$V_0$ = voltage, in Fig. 1 of battery 7,
$\beta$ = the ratio of electron velocity in the electron beam to the velocity of light,
$\lambda$ = wave length,
$J_1$ = the Bessel function of order 1, and
$V_1$ = the maximum or peak value of the alternating voltage appearing across the buncher grids.

Any convenient consistent system of units can be used in the above expressions.

For small values of $x$ in an ordinary "klystron,"

$$\frac{J_1(x)}{x} = \frac{1}{2}$$

and as $x$ increases, $G_m$ decreases, passing through zero and oscillating as indicated in Fig. 4. With variation of amplitudes of oscillation, the mutual conductance varies, according to an oscillating curve which is not constant for any appreciable part of its length except where $x$ is close to zero. It is only when operating with the mutual conductance very nearly constant that a small change in radiation resistance of the radiator can produce a large relative change in amplitude of oscillation, but if a large absolute change of amplitude is desired, as well as a large relative change, the oscillator must have a large amplitude of oscillation. In the ordinary "klystron," the mutual conductance is not constant when the amplitude of oscillation is large, hence we may have a large relative change of amplitude with the "klystron" operating at small amplitude of oscillation or we now have a small relative change of amplitude with the "klystron" operating at large amplitude of oscillation. In the present invention there are means for producing both a large amplitude of oscillation of the "klystron" and a large proportionate change in amplitude as a function of radiation resistance at one and the same time. Under special conditions as represented in Fig. 4 by the curve marked "over-bunched" excitation, the mutual conductance can either decrease or increase with change in amplitude depending on the degree of bunching. These conditions are produced in the arrangement shown in Fig. 1.

Circuit members 1 and 2 and the elements associated with them are operated as described before substantially like an ordinary "klystron." Resonators 3 and 4 operate substantially like an ordinary "klystron" except that the amplitude of oscillation in member 3 is greater than is usual in the "buncher" of a "klystron." This is obtained by adjusting the coupling 17, 31. That is, the amplitude of oscillation in member 3 is greater than the normal amplitude used in member 1. The greater than usual amplitude of oscillation in member 3 produces a greater than usual alternating field between grids 28 and 29. This field imparts larger than usual changes in velocity to the electrons drawn from emitter 32 through grids 28 and 29. The result is that the electrons after leaving grid 29 become bunched to the optimum degree sooner in their transit toward grid 34 than they would with normal excitation, and by the time they reach grid 34 they have already passed through a condition in which they would extract energy from a "catcher" circuit, and are progressing toward a second bunched condition in which they would deliver energy when they reach resonator 4.

Now in the curves of Fig. 4 if an amplitude of oscillation is selected in which the mutual conductance of the normal "klystron," 1, 2, is decreasing, and the excitation of member 3 is adjusted so the mutual conductance at the same amplitude is increasing, anything that occurs in the system to change amplitude will cause the mutual conductance associated with the "klystron" 1, 2 and the electron beam thereof to change in the opposite way from the mutual conductance associated with the "klystron" 3, 4 and the electron beam thereof. That is, when the mutual conductance of members 1 and 2 increases, the mutual conductance at members 3 and 4 decreases and vice versa. The resultant effect is that over a portion of the operating range of amplitudes of the system, the mutual conductance of the system is substantially constant.

Under these conditions of operation the system can oscillate and radiate at a comparatively high power output, and at the same time be sensitively responsive to an incoming signal or to a change in radiation resistance. In such a mode of operation the arrangement shown in Fig. 1 may be placed relative to a parabolic reflector as described in application Serial No. 185,332, with the antenna 10'' connected to coupling loop 19 or the opening 29 facing the mirror at the mirror focus, or it may radiate without the aid of any other apparatus. If the transmitted beam goes out into uninterrupted space the system will oscillate and radiate stably.

If while the system is radiating, a reflecting surface is placed to intercept the transmitted beam, some radiation may be reflected back into the circuit member 1 either through coupling loop 19 or opening 20. This returned energy either adds to or subtracts from the energy in member 1 depending upon its phase. If, for example, it adds to the energy of member 1, bunching increases and the amplitude of oscillation increases. This causes circuit member 2 to oscillate at greater amplitude, and to excite member 3 more strongly. Circuit member 3 bunches the beam traversing grids 28 and 29 to a greater extent than before and this correspondingly affects circuit member 4 which finally reacts on member 1 through 36, 12. Referring again to Fig. 4, it will be seen that the increase of amplitude of oscillation in members 1 and 2 results in a decrease of mutual conductance, whereas the increase of amplitude in members 3 and 4 results in an increase of mutual conductance. The combined effect of these changes is to retain for the system a substantially unchanged mutual conductance over a limited zone as indicated by the substantially horizontal portion of the curve shown in dash lines.

This system under the conditions described is, in the region specified, stably sensitive to received radiation, to which it responds depending on the magnitude and phase of the received signals. The responses of the apparatus to the received signal are detected, in the electron beam emerging from grid 15, by the elements numbered 21 to 27 inclusive. The particular arrangement for detection shown in Fig. 1 is only one of several that can be used. Other detection arrangements have been disclosed in application Serial No. 185,382 and Patents 2,272,165 and 2,280,824.

Figure 2:
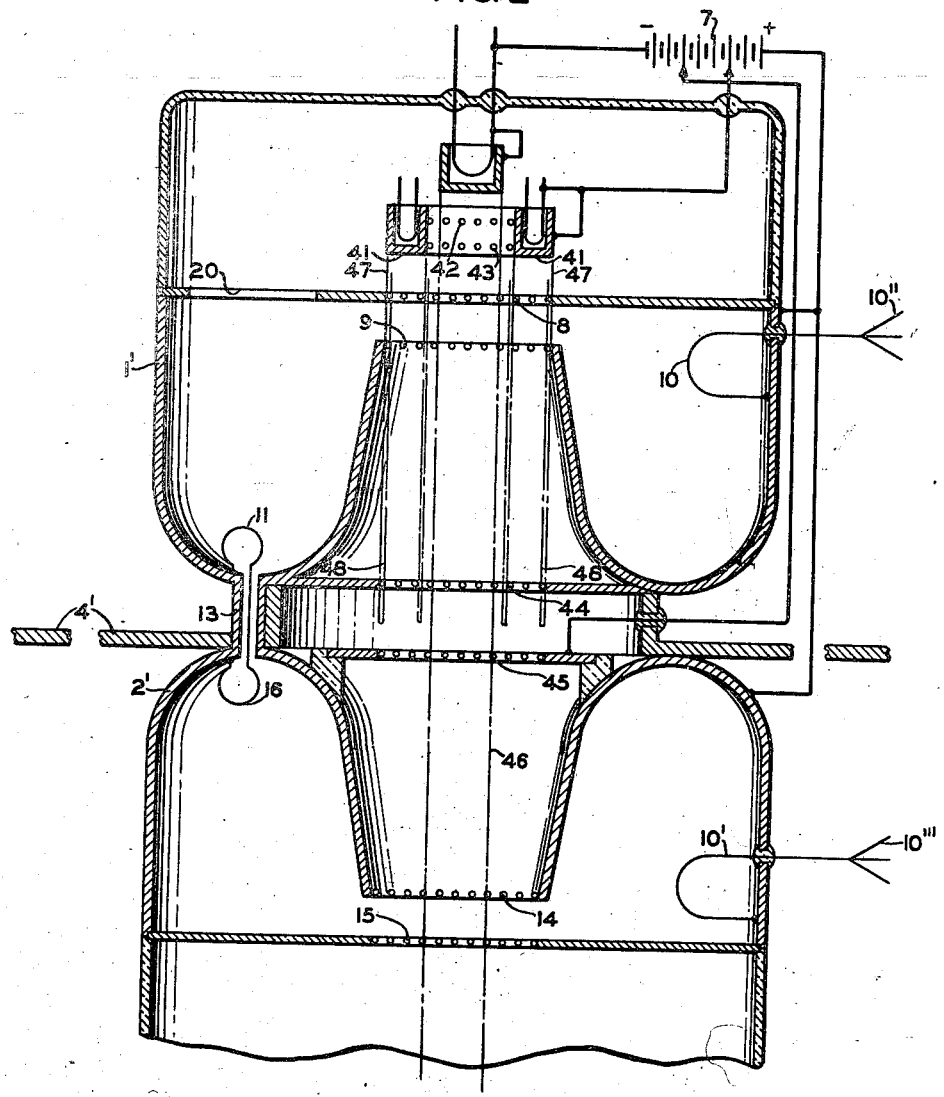
Fig. 2 is a diagram of the present invention having properties similar to those of Fig. 1, but with two concentric electron beams for excitation.

The general principles involved in the operation of the embodiment of this invention shown in Fig. 1 are applied also in a second embodiment shown in Fig. 2. In Fig. 2 only two circuit members 1' and 2' are employed. Members 1' and 2' have the same grids, coupling loops, and other appurtenances as in the structure of Fig. 1 except those associated also with circuit members 3 and 4 of that figure which of course are not required. In Fig. 2 two electron emitters 5 and 41 are used. Emitter 5 is similar to the corresponding emitter of Fig. 1, but is made somewhat smaller in proportion to the size of grids 8 and 9. Emitter 41 is of annular form concentric with and surrounding emitter 5. Two grids 42 and 43 are provided in front of emitter 5 for the control of the shape of the field in the immediate vicinity of emitter 5. Two other grids 44 and 45 are provided at the adjacent surfaces, as shown, of circuit members 1' and 2'. Grid 44 is connected to member 1' while grid 45 is insulated from member 2' although supported thereon. Grids 42 and 43 are connected to emitter 41 and are maintained at a potential which is positive with respect to emitter 5. Grid 45 is positive with respect to emitter 5 and negative with respect to emitter 41.

In the operation of the structure of Fig. 2, electrons from emitter 5 are formed as a cylindrical beam 46 projected along the axis of the system. This beam of electrons passes through resonant circuit members 1' and 2' as usual in the "klystron" providing excitation for member 2' feeding back through interconnected loops 10 and 11 to member 1'. Electrons from emitter 41 are formed as a beam 47 of annular cross section surrounding beam 46 and coaxial therewith. The electrons of beam 47 pass through member 1' and are bunched as usual, but they do not enter circuit member 2'. Instead they are reversed in transit between grids 44 and 45 by the action of the latter grid, and they are projected back through grids 9 and 8. The reversal of the electrons of beam 47 between grids 44 and 45 is, of course, the consequence of having grid 45 negative with respect to the emitter 41. The reversal of the electrons of beam 47 is illustrated in Fig. 2 by the doubling back of the boundary lines of beam 47, as indicated by the lines 48. These electrons of beam 47 are acted upon for bunching by member 1' when they pass initially through grids 8 and 9 in their travel toward grid 44, and the bunching process continues during the time the electrons travel from grid 9 through grid 44 toward grid 45 and then back to grid 9. The energy of the bunched electrons of beam 47 acts upon the field of 1', these electrons being in an overbunched condition such that the mutual conductance contributed by this beam is increasing with increasing amplitude.

The operation of Fig. 2 in combined transmission and reception is similar to that of Fig. 1 as explained before with reference to Fig. 4. The characteristic of ordinary excitation shown in Fig. 4 is obtained by the action of the beam 46 from the emitter 5, and the characteristic of over bunched excitation is obtained by the action of the beam 47 from the emitter 41. The combined action of these two beams gives the combined excitation characteristic shown in dash lines in Fig. 4, i. e. a region in which the mutual conductance changes but little over a definite range of amplitudes. Accordingly, Fig. 2 can be used for those operations requiring simultaneous transmission and reception of signals as described for Fig. 1, in which case the shield 4' or equivalent is employed. In Fig. 2 the elements 21 to 27 inclusive shown in Fig. 1 for signal detection have been omitted for convenience, although they would be used in the same way in Fig. 2 as in Fig. 1.

Figure 3:
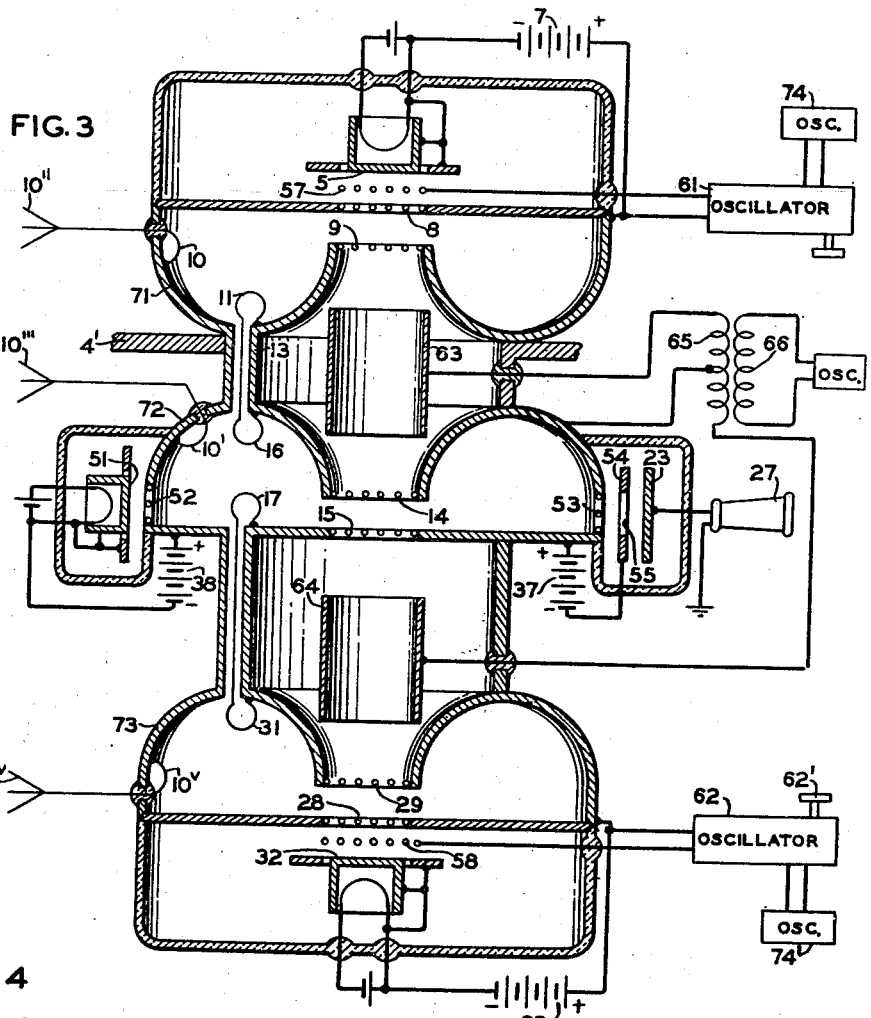
Fig. 3 is a diagram of the present invention employing two opposed electron beams for excitation.

Another arrangement capable of operating in a manner similar to that described for Figs. 1 and 2 is shown in Fig. 3. In this figure there are also disclosed elements for accomplishing additional functions. In Fig. 3, three resonant circuit members 71, 72 and 73 are shown mutually spaced and centered on the same axis. Members 71 and 72 perform the functions of members 1 and 2 in Fig. 1 and members 72 and 73 perform the functions of members 3 and 4 in Fig. 1. A beam of electrons is projected from an emitter 5 through members 71 and 72, and another beam of electrons is projected from a second emitter 32 through members 73 and 72.

A third beam of electrons is produced by a third electron emitter 51 which projects this beam through member 72 transversely of the axis of the system. This beam of electrons is admitted to member 72 through a grid 52 in the wall thereof. The beam passes between the faces containing grids 14 and 15, and it leaves member 72 through a grid 53. The electron beam after emerging from grid 53 is intercepted by a plate 54 in which there is an opening 55, and the part of the electron beam that goes through the opening 55 impinges on a plate 23.

Between the emitters 5 and 32 and their respective adjacent circuit members 71 and 73 are control grids 57 and 58 connected to oscillators 61 and 62 respectively. Coaxial with the system are located two conducting tubes 63 and 64 between circuit members 71 and 72 and between circuit members 72 and 73, respectively. Tubes 63 and 64 are connected to the respective ends of a center tapped secondary coil 65 of a transformer 66.

This arrangement shown in Fig. 3 can be operated in several ways. One method of operation corresponds closely to that of Fig. 2. The beam of electrons from emitter 5 operates like the central electron beam of Fig. 2, and the beam of electrons from emitter 32 operates like the outer electron beam of Fig. 2 which produces nonlinear feed-back of energy into the member 72. The operation of the two systems with reference to Fig. 4 is the same.

In Fig. 3 the physical arrangement is such that the detector shown in Fig. 1 is not so convenient to use, and the transverse electron beam through member 72 is used instead. The operation of the transverse beam in detection is in accordance with principles disclosed in Patent No. 2,272,165, wherein it is disclosed that the electron beam is deflected vertically with respect to horizontal grids 14 and 15 by the alternating electric field between grids 14 and 15. The deflection of the electron beam is a function of the amplitude of oscillation in the member 72, and the detected signal received from plate 23 by the receiver 27 is also a function of the same amplitude. The plate 54 can be arranged with reference to the transverse electron beam so that with no oscillation in member 72 substantially the entire cross section of the electron beam will pass through opening 55, or so that practically none of the beam goes through. In either case, oscillation developed in member 72 will cause a variation in the number of electrons passing through opening 55, the variation in the number of the electrons being a proportional or other function of the amplitude.

A second way of operating and using the arrangement of Fig. 3 is as a modulating system whereby the system is momentarily set into strong oscillation for the purpose of transmitting a strong signal and then the system has its oscillations damped so that the same will act as a sensitive receiver of reflected waves. When thusly operating, the coupling 17, 31 is adjusted so that member 73 does not overbunch the electron stream but cooperates fully with member 71, the two vertical beams from emitters 5 and 32 being adjusted so as to be equal. A modulating voltage of any practical frequency is introduced at the transformer 66 and through coil 65 to the tubes 63 and 64. In the center-tapped connections shown, the tube 63 will increase in potential when tube 64 decreases and vice versa. The effect of a variation in voltage of tube 63 taken alone is to change the time of flight of electrons in their course from member 71 to member 72, and also causes the frequency of oscillation of member 72 to vary slightly, an effect which may be undesired. A corresponding and opposing effect occurs as a result of variation of voltage of tube 64. In the complete arrangement of Fig. 3, the power of excitation of member 72 can be drawn equally from members 71 and 73. Also, the adjustment of the system can be modulated by voltage from coil 65, and the effects of frequency change due to changes in time of flight in tubes 63 and 64 is neutralized by the tendency to increase frequency due to one direction of change of voltage in one tube and the tendency to decrease frequency due to the opposite direction of change in voltage in the other tube. That is, if the tube 63 is swung positive with a resultant tendency to increase frequency, the tube 64 will be swung negative and its tendency will be to reduce frequency. The net effect will be that the amplitude of oscillation in member 72 will be reduced without any change in frequency.

This type of modulator is readily adapted to practice of the present invention, for if the modulating voltage is great enough to stop oscillation during part of the cycle of the modulating frequency, we have the condition known in the art as superregeneration. As is well known, a superregenerative receiver is very sensitive to incoming waves during the time when an oscillating state is building up in the system, and, at the same time, the average amplitude of oscillation for radiative purposes may be moderately large.

A third mode of operation of Fig. 3 is related to the operation of Fig. 1, and is explaned with reference to Fig. 4. In this mode of operation, the system acts as a transmitter and as a receiver of radio signals. As explained before, the ordinary "klystron" is a sensitive detector when its amplitude of oscillation is small, but is less sensitive when the amplitude is large. Accordingly, it can operate either as a detector or as a transmitter satisfactorily by periodically shifting the amplitude from one magnitude to another. This is accomplished in Fig. 3 by the action of either one of oscillators 61 or 62. Either one or the other alone is sufficient so if one is used the other may be omitted. Assuming the use of oscillator 62, for example, the electron beam from emitter 5 and the coupling of loops 11 and 16 between members 71 and 72 are adjusted so that without the assistance of the electron beam from emitter 32 the system oscillates weakly and acts as a sensitive detector. With the electron beam from emitter 32 added at every positive half cycle of member 62, the system is adjusted so that it oscillates vigorously. Then, the oscillator 62 is arranged so that its frequency can be varied as desired as by adjusting knob 62', and so that it impresses a potential on grid 58 sufficient to substantially stop the electron beam from emitter 32 during alternate half cycles of the frequency of oscillator 62.

In using the device as shown, there may under some circumstances be trouble caused by the electrons that pass clear through the catcher circuit, circuit member 72, and enter the buncher member 71 or member 73 opposite their point of origin. In many cases these electrons will have a more or less random distribution in time, and should therefore cause little trouble, but in case they do make trouble, these electrons can be completely removed by setting the two beams from the two bunchers, circuit members 71 and 73, at a slight angle with respect to each other, or the use of magnetic or electrostatic deflecting fields in the spaces between the members.

The operation of the system then develops as follows: Energy is radiated by means of coupling loop 10' and the antenna 10''' connected thereto. The radiated energy goes away from the oscillator and if a reflecting surface such as a remote object, for example an aircraft, is present at a practical distance from the system, some of the radiated energy is reflected back to the system. This reflected and returned energy enters member 71 through antenna 10'' and is detected by the transverse electron beam from emitter 51, in the receiver 27. In the use of this system the operation is substantially as described in application Serial No. 185,382, in which separate detectors and transmitting oscillators are used. Apparatus made in accordance with Fig. 3 is suitable for the same use as separate transmitters and detectors, the difference being in the structural combination and the necessary modifications. In the use of oscillators and detectors intermittently started and stopped at constant frequency there are, as mentioned in application Serial No. 185,382, alternate regions in the radiation field from which reflected signals vary from zero to maximum. To avoid "dead spaces" in the observed field the interrupting frequency is frequency modulated at a lower frequency by an additional oscillator 74 and 74' connected to modulate the frequency of oscillators 61 and 66. Arrangements for accomplishing this are shown in application Serial No. 185,382.

The change in frequency which would ordinarily occur when the electron beam current through member 72 is changed may be avoided by making the time of flight of electrons in the beam from emitter 32 such that the electrons will arrive in member 72 slightly out of phase with the beam from emitter 5. This will cause the beam from emitter 32 to produce another and independent change of frequency when the beam from emitter 32 is started and stopped and which may be made either positive or negative and of considerable magnitude. This can be used to neutralize the change in frequency due to presence of an increased number of electrons in members 72 and 73.

A fourth way of operating the system shown in Fig. 3 is to use it as a superregenerative detector. This is accomplished by using one of the beams for stopping the oscillations normally produced by the other beam. For example, the beam from emitter 5 may be adjusted so that with the beam from emitter 32 cut off, oscillations build up rapidly, but with the beam from emitter 32 added the oscillations are abruptly stopped. This is accomplished by timing the beam from emitter 32 to enter member 72 in phase opposite to that of the beam from emitter 5. Oscillator 62 is adjusted to cut off the beam from emitter 32 each half cycle. This starts and stops oscillations each cycle as required for superregenerative operation.

In Figs. 1 to 3, if desired, only a single radiating means supplied from either the electron grouping circuit or on the electron absorbing circuit may be used both as transmitter and receiver.

In Figs. 1, 2, and 3, the usual arrangements for enclosing the system in evacuated enclosures have been left out of the drawings for convenience as they will be readily understood with reference to the art generally and to the related copending applications cited.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. Object detecting apparatus, comprising means for producing a stream of electrons, means including a first cavity resonator in energy-interchanging relation with said stream for velocity modulating said stream, means for causing said velocity-modulated stream to become bunched, means including a second cavity resonator in energy-interchanging relation with said bunched stream for extracting high frequency energy therefrom, means coupled to said second resonator for transmitting high frequency energy toward an object to be detected, means coupled to said first cavity resonator for receiving high frequency energy reflected from said object, and means for detecting changes in the velocity variations of said electron beam to provide an indication of said object.

2. Object detecting apparatus, comprising a transmitting circuit employing a hollow resonator and including means for radiating electromagnetic energy toward an object to be detected, a receiving circuit also employing a hollow resonator and including means for receiving energy reflected by said object, and means for coupling an electron beam to said circuits, whereby an object to be detected serves to back-couple said transmitting circuit to said receiving circuit by reflection of transmitted electromagnetic waves to said receiving circuit.

3. An oscillator-detector comprising a system of hollow conducting bodies, means for projecting electron beams therethrough to excite high frequency oscillations therein, said bodies having means providing for the escape of high frequency radiation therefrom, and means for detecting changes in the equivalent radiation resistance of said escape means.

4. The method of simultaneously generating, transmitting, receiving, and detecting radio oscillations by means of apparatus having a hollow conducting body and a source of exciting current, which consists in producing electromagnetic waves in said hollow conducting body by supplying a substantially constant exciting current, radiating energy from said hollow conducting body, receiving a portion of said radiated energy back into said body by reflection from a distant object, causing said reflected energy to vary the amplitude of the produced oscillations in said body, and causing the variation in said amplitude to be detected.

5. Apparatus for simultaneously generating, transmitting, receiving and detecting radio oscillations, comprising a hollow conducting resonant body adapted to contain electromagnetic waves, means for producing electromagnetic waves in said body comprising means for supplying a substantially constant electron current thereto, means for radiating high frequency energy from said hollow conducting body, means for receiving a portion of said radiated energy back into said body after reflection from a distant object, means for causing said reflected energy to vary the amplitude of the produced oscillations in said body, and means for detecting the variation in said amplitude.

6. High frequency apparatus comprising a system of hollow conducting resonant bodies adapted to contain electromagnetic oscillations, means for projecting an electron beam therethrough to excite oscillations therein, at least one of said resonant bodies having means providing for the escape of radiation therefrom, and means for detecting changes in the equivalent radiation resistance of said escape means.

7. In a device of the character described for locating objects, a unitary structure comprising a transmitting circuit employing a hollow resonator, a receiving circuit also employing a hollow resonator, and electron beam amplifying means interconnecting said circuits, the object to be located serving as a means for back coupling said transmitting circuit to said receiving circuit by reflection of electromagnetic waves to the latter.

8. An object detecting system comprising a transmitting circuit employing a hollow resonator, a receiving circuit also employing a hollow resonator, and an electron beam coupling said receiving circuit to said transmitting circuit, the object to be detected serving as a means for back-coupling said transmitting circuit to said receiving circuit by reflection of electromagnetic waves to said receiving circuit.

9. Object detecting apparatus, comprising means for producing a uniform-velocity, constant-intensity stream of electrons, means for varying the velocities of the electrons of said stream at a high frequency, means providing a field-free drift space in the path of said velocity-varied stream for causing said velocity-varied electrons to become grouped, whereby said electron stream forms a varying-current electron stream, means for extracting high-frequency energy from said varying-current electron stream, means coupled to said extracting means for transmitting high frequency energy toward an object to be detected, means for exciting said velocity-varying means by energy received by reflection from said object, and means for detecting variations in the amplitude of said extracted energy to provide an indication of said object.

10. Object detecting apparatus, comprising means for producing an electron stream, means for velocity modulating said electron stream, receiving antenna means coupled to excite said modulating means, means for causing said modulated electron stream to become bunched, means for extracting high frequency energy from said bunched stream, feedback coupling means interconnecting said extracting and modulating means and adjusted to maintain said extracting means barely in oscillation, transmitting antenna means coupled to be excited by said extracting means, and means for detecting changes in the amplitude of oscillation of said extracting means whereby a remote object may be detected by reception by said receiving means of energy radiated by said transmitting means and reflected by said object.

11. Object detecting apparatus, comprising means for producing an electron stream, means for producing periodic variations in the current of said stream, means for extracting high frequency energy from said varying-current stream, feedback coupling means interconnecting said varying and extracting means and adjusted to maintain said extracting means barely in oscillation, means for transmitting energy derived from said extracting means, means for controlling said stream-varying means in response to energy received by reflection of said transmitted energy from a remote object, means for detecting changes in the amplitude of oscillation of said extracting means to detect said object and non-linear feedback means between said extracting and varying means for maintaining substantially constant mutual conductance between said varying and extracting means.

12. Object detecting apparatus as in claim 10, further including means for maintaining substantially constant mutual conductance between said modulating means and said extracting means, whereby said apparatus is rendered sensitive over a wide range of amplitudes of oscillation of said extracting means.

13. In a device of the character described, a velocity grouped electronic device having at least two coupled resonant circuit members, means providing a non-linear feed-back of energy from one of said circuit members to the other, said one circuit member having means for radiating electromagnetic energy while said other circuit member has means for receiving electromagnetic energy, and means for detecting increments of energy returned to the device by reflection of the radiation thereof.

14. High frequency apparatus comprising an electronic device having at least two coupled resonant circuit members, one of said circuits having means for radiating electromagnetic energy and the other of said circuits having means for receiving electromagnetic energy, means providing a non-linear feedback of energy between said circuit members, and means for detecting increments of energy returned to said device by reflection of the radiation thereof.

15. An oscillator-detector for detecting the proximity of objects serving as reflectors of radio waves which comprises an electromagnetic oscillator, a detector responsive to changes in the amplitude of oscillation of said oscillator, a radiating element to radiate energy from said oscillator, and feed-back means for exciting said oscillator-detector which are non-linear as a function of amplitude of oscillation of said oscillator-detector for rendering the oscillator amplitude sensitive to small changes in the radiation resistance of said radiating element.

16. A radio transmitter in which the amplitude of oscillation is sensitive to small changes in radiation resistance which includes a radiating system comprising an electron grouping circuit, an energy absorbing circuit, two excitation feedback circuits between the energy absorbing circuit and the electron grouping circuit, one of said feed-back circuits returning energy to the electron grouping circuit as a linear function of the energy stored in the energy absorbing circuit, and the other of said feed-back circuits returning energy to the electron grouping circuit as a non-linear function of the energy stored in the energy absorbing circuit.

17. High frequency apparatus in which the amplitude of oscillation is sensitive to small changes in the radiation resistance of an output circuit, comprising an electron grouping circuit, an energy absorbing circuit coupled to said output circuit, and a feedback circuit returning energy to said grouping circuit as a non-linear function of the energy stored in the absorbing circuit.

18. Electron discharge apparatus, comprising first and second hollow resonators having respective sets of aligned apertures, means for producing an electron beam and for directing said electron beam through said aligned apertures so that said beam is velocity modulated in traversing said first resonator and is bunched on arrival at said second resonator and yields energy thereto, and means for producing an auxiliary oppositely directed electron beam coupled to said resonators, whereby said auxiliary electron beam is velocity modulated and feeds back energy from said second resonator to said first resonator.

19. Electron discharge apparatus, comprising means for producing an electron stream, a first hollow resonator in energy interchanging relation with said stream, a second hollow resonator also in energy interchanging relation with said stream, and means for producing an auxiliary electron stream coupled to each of said resonators for supplying high frequency energy therebetween.

20. Electron discharge apparatus, comprising means for producing an electron stream, means for velocity modulating said electron stream, means for extracting high frequency energy from said modulated electron stream, and means including an auxiliary electron stream coupled to said modulating means and said extracting means for feeding back energy from said extracting means to said modulating means.

21. The method of producing substantially constant mutual conductance over a relatively wide range of amplitudes of alternating input voltages in an electron beam device having a pair of cavity resonators coupled by an electron beam, comprising the steps of producing an auxiliary beam of free electrons, controlling said auxiliary beam in accordance with energy derived from one of said resonators, and causing said controlled auxiliary beam to interchange energy with the other of said resonators.

22. High frequency apparatus comprising means for producing an electron stream, means for velocity modulating said electron stream, means for extracting high frequency energy from said modulated stream, means defining a field-free drift space between said modulating means and said extracting means, and means for maintaining substantially constant mutual conductance between said modulating means and said extracting means over a wide range of amplitudes of excitation of said modulating means.

23. The method of producing substantially constant mutual conductance in an electron beam velocity modulation device having a pair of cavity resonators coupled by an electron beam, comprising the steps of producing an auxiliary electron beam, velocity modulating said auxiliary electron beam in accordance with energy derived from one of said resonators, and causing said modulated electron beam to be coupled to said second resonator in overbunched condition.

24. High frequency amplifier means, comprising means for producing an electron stream, means for modulating said electron stream at a high frequency, means for extracting high frequency energy from said modulated stream, and means providing non-linear feedback of energy from said extracting means to said modulating means, whereby substantially constant mutual conductance is obtained.

25. In an oscillating system, electron grouping means, electromagnetic energy absorbing means, means for compensating for non-linearity of delivered power as a function of strength of oscillation of said electron grouping means, said means comprising a non-linear feedback device between said electron grouping means and said energy absorbing means.

26. High frequency apparatus, comprising a pair of hollow cavity resonators, and means providing non-linear coupling between said resonators, said means including an electron stream coupled to one of said resonators to be strongly velocity modulated thereby and coupled to the other of said resonators in overbunched condition to deliver high frequency energy thereto.

27. High frequency apparatus comprising means for producing an electron stream, a pair of substantially closed cavity resonators in energy interchanging relation with said stream, and means providing a self-exciting non-linear feedback of energy between said resonators.

28. Apparatus as in claim 27, wherein said non-linear feedback means comprises a second electron stream coupled respectively to said cavity resonators.

29. High frequency apparatus comprising an oscillatory circuit comprising a pair of substantially closed electron beam excited resonators and means providing a self exciting feed back of energy therebetween which is a non-linear function of the energy in the circuit.

30. High frequency apparatus comprising an oscillatory system comprising coupled circuits including an electron grouping circuit and an energy absorbing circuit and non-linear feedback means, said electron grouping circuit being coupled to said energy absorbing circuit through said non-linear feed-back means.

31. A detector for use in connection with velocity grouped electronic circuit means delivering a stream of electrons of variable velocity, comprising a pair of grids of differing potentials extending across the electron stream and at an angle thereto for reflecting slower electrons to one side of the stream, a plate positioned for catching electrons thus reflected by said grids, a second plate positioned for catching electrons passing directly through said grids, and a receiver connected to be supplied in push-pull by the detected signal thus received by said plates.

32. A detector for use in connection with velocity grouped electronic circuit means delivering a stream of electrons of variable velocity, comprising a grid extending across the electron stream and at an angle thereto for reflecting slower electrons to one side of the stream, a plate positioned for catching electrons thus reflected by said grid, a second plate positioned for catching electrons passing directly through said grid, and a receiver connected to be supplied by the detected signal thus received by said plates.

33. Detecting apparatus for a velocity-modulated electron stream, comprising means for reflecting slower electrons to one side of said stream, means for collecting said reflected electrons, means for collecting the remainder of said electron stream, and receiver means excited in push-pull by said two collecting means.

34. Apparatus for detecting a velocity-modulated electron stream, comprising means for collecting electrons having velocities below a predetermined value, means for collecting electrons of said stream having velocities above said value, and means for combining the outputs of said collecting means.

35. Detecting apparatus for a velocity-modulated electron stream, comprising means for reflecting a portion of the electrons of said stream to one side of said stream, means for collecting said reflected electrons, and output means connected to said collecting means.

36. A detector for use in connection with velocity-modulated circuit means delivering a stream of electrons of variable velocity, comprising means for reflecting slower electrons to one side of said stream, a plate positioned for catching electrons reflected by said first-named means and extending generally in the direction of said unreflected stream, and output means connected to said specific plate.

37. A high frequency tube arrangement comprising means for producing a stream of electrons traveling at a given average velocity, an input circuit for modifying the velocity of electrons in said stream in accordance with modulated high frequency waves, means for allowing said modified electrons to form groups in said beam, resonant circuit means for extracting energy from said electron groups thereby causing a slowing down of the electrons in said beam, means for deflecting said slowed electrons in a given direction, means arranged in the path of resulting deflected electrons of a certain velocity for producing an output current, said last-mentioned means comprising an electrode disposed substantially longitudinally of said stream of electrons and displaced from the axis thereof, and a signal-responsive device connected to said electrode.

38. High frequency apparatus comprising an electronic oscillator having a curved characteristic of delivered power as a function of amplitude of excitation, and means exciting said oscillator with two components of back coupling, one of said components having a linear relationship to said amplitude and the other of said components having a non-linear relationship to said amplitude, whereby said non-linear component of back coupling compensates for the effect, upon the behavior of said electronic oscillator, of the curved characteristic of delivered power as a function of said amplitude of excitation.

WILLIAM W. HANSEN.
RUSSELL H. VARIAN.
SIGURD F. VARIAN.